US006131019A

United States Patent [19]

King

[11] Patent Number: 6,131,019

[45] Date of Patent: Oct. 10, 2000

[54] VEHICLE COMMUNICATION SYSTEM WITH TRAINABLE TRANSMITTER

[75] Inventor: Joseph D. King, Ann Arbor, Mich.

[73] Assignee: Lear Automotive Dearborn, Inc., Dearborn, Mich.

[21] Appl. No.: 09/099,693

[22] Filed: Jun. 18, 1998

[51] Int. Cl.[7] .............................. H04B 1/034; H04B 1/06

[52] U.S. Cl. ............................. 455/99; 455/345; 455/129

[58] Field of Search ............................. 455/99, 129, 132, 455/345, 42, 205, 83

[56] References Cited

U.S. PATENT DOCUMENTS

| | | | |
|---|---|---|---|
| 3,532,986 | 10/1970 | Gelushia et al. | 455/345 |
| 4,009,375 | 2/1977 | White et al. | 455/99 |
| 4,083,003 | 4/1978 | Haemming | 455/99 |
| 4,606,073 | 8/1986 | Moore | 455/345 |
| 4,878,052 | 10/1989 | Schulze . | |
| 4,905,304 | 2/1990 | Bardon et al. | 455/345 |
| 5,649,303 | 7/1997 | Hess et al. | 455/63 |
| 5,722,058 | 2/1998 | Umemoto et al. | 455/345 |

FOREIGN PATENT DOCUMENTS

| | | |
|---|---|---|
| 2 300 945 | 11/1996 | United Kingdom . |
| WO9942970 | 8/1999 | WIPO . |

OTHER PUBLICATIONS

International Search Report dated Nov. 8, 1999 in International Application No. PCT/US99/13603.

*Primary Examiner*—Reinhard J. Eisenzopf
*Assistant Examiner*—Eliseo Ramos-Feliciano
*Attorney, Agent, or Firm*—Niro, Scavone, Haller & Niro

[57] ABSTRACT

A vehicle communication system includes a trainable transmitter that is connected with the antenna associated with the AM/FM radio receiver in the vehicle. The trainable transmitter preferably is capable of learning a variety of communication signals and then later, selectively transmitting them to communicate with a variety of external, remotely located devices. A system designed according to this invention allows a single antenna to be used for emitting signals and receiving signals and, moreover facilitates communication with a variety of remotely located devices such as a garage door opener and a home security system.

14 Claims, 1 Drawing Sheet

FIG. 1
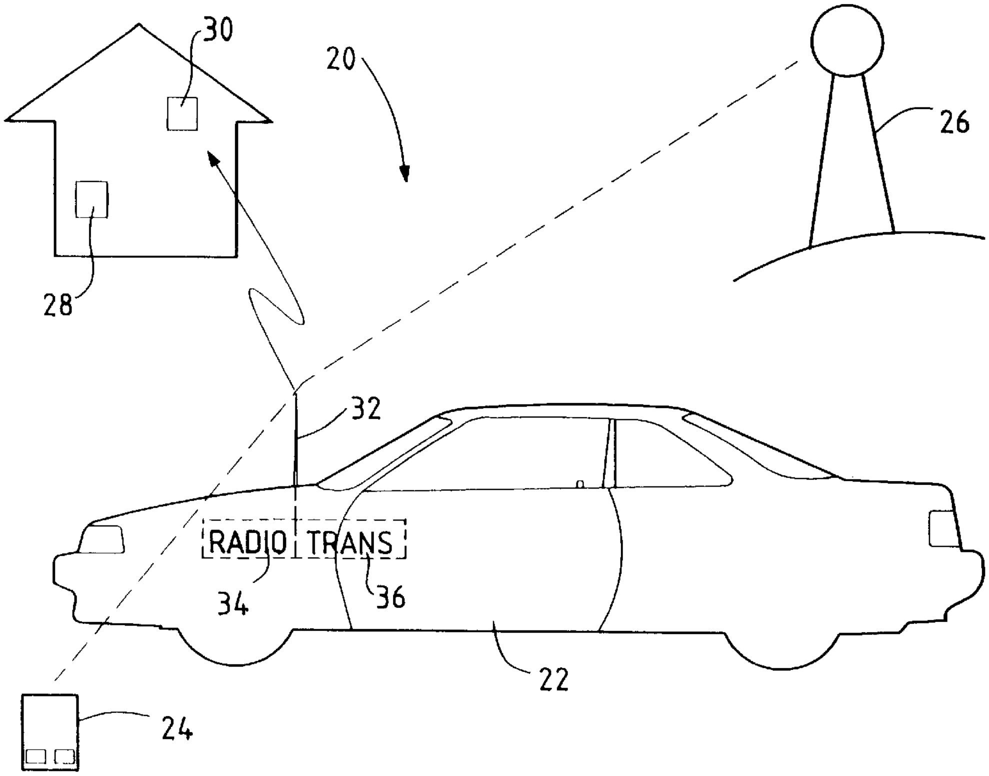
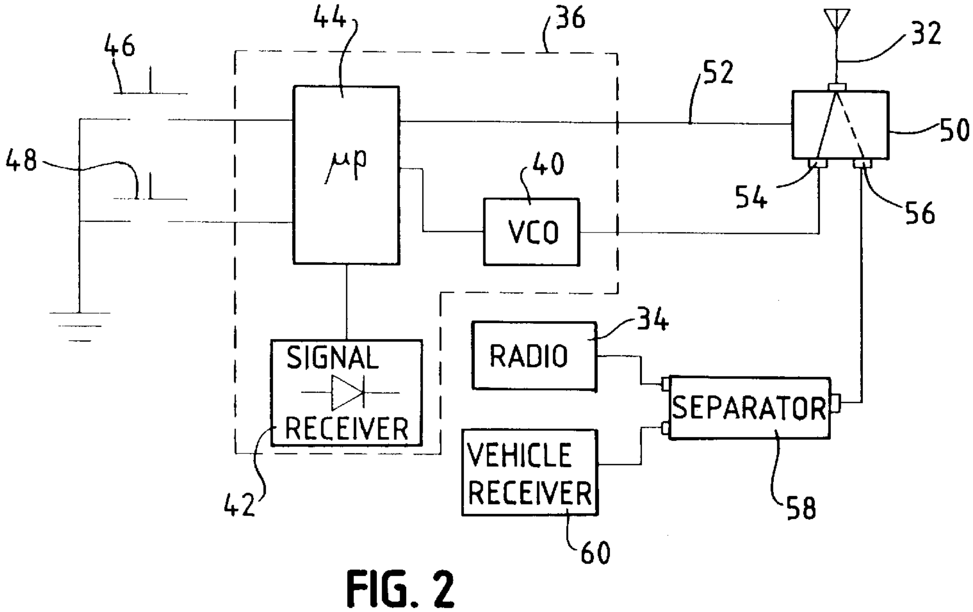
FIG. 2

VEHICLE COMMUNICATION SYSTEM WITH TRAINABLE TRANSMITTER

BACKGROUND OF THE INVENTION

This invention generally relates to a vehicle communication system including a trainable transmitter that emits a communication signal through the antenna that is associated with the AM/FM radio.

The variety of features and amenities provided with vehicles continually increases. With advances in technologies, and corresponding decreases in cost, vehicle manufacturers are including more and more capabilities and luxuries into vehicles. One drawback associated with this increase in features is that the vehicle owner must utilize a variety of transmitters or other devices. For example, a typical car owner may have one transmitter to communicate with a garage door opener, a second transmitter for communicating with a home security system, a third transmitter for communicating with the vehicle anti-theft system and a separate cellular telephone or other portable communication system. Handling all of these transmitters and finding a convenient place for them within a vehicle can be annoying and, at times, distracting from the task of driving a vehicle.

Another drawback associated with current vehicle communication systems is that antennas for transmitters and receivers are typically located in hidden places within the vehicle. Vehicle manufacturers require communication device antennas to be hidden from view. This introduces a variety of problems including reduced signal transmission caused by the surrounding vehicle structure. Further, because space within a vehicle is limited, antennas and transmitter or receiver components must be relatively small, which introduces complexities and undesirable costs.

It would be useful to provide a vehicle communication system that is capable of handling communications with a variety of peripheral devices located remotely from the vehicle. This invention provides such a system. The invention includes a trainable transmitter that is capable of learning and transmitting a variety of communication signals to communicate with a variety of peripheral, remotely located devices. In a system designed according to this invention, the trainable transmitter is selectively coupled with the antenna that is associated with the AM/FM radio receiver.

SUMMARY OF THE INVENTION

In general terms, this invention is a vehicle communication system that has a transmitter that selectively transmits communication signals from the antenna associated with the AM/FM radio receiver. A system designed according to this invention preferably includes an antenna that is supported on the exterior of the vehicle. It is not necessary, however, that the antenna be supported on the exterior of the vehicle. As an example, an antenna may be supported within the vehicle windshield. Recently it has even been proposed to incorporate the antenna into the interior of the vehicle. It should be understood that the invention would extend to any application of an antenna on a vehicle. A radio receiver is coupled with the antenna so that the radio receiver can receive broadcast radio signals that are collected by the antenna. A trainable transmitter is coupled to the antenna so that the antenna emits a communication signal that is selectively generated by the transmitter for communicating with a device located remotely from the vehicle.

In the preferred embodiment, a function selector is coupled between the antenna and the radio receiver and between the antenna and the transmitter. The function selector has a first operative condition for coupling the antenna with the radio receiver so that the radio receiver can receive broadcast radio signals. Whenever it becomes desirable to transmit a signal from the transmitter, the function selector connects the antenna to the transmitter so that the communication signal generated by the transmitter is emitted from the antenna. While the antenna is coupled to the transmitter, the radio receiver is temporarily disconnected from the antenna.

The various features and advantages of the invention will become apparent to those skilled in the art from the following detailed description of the preferred embodiment. The drawings that accompany the detailed description can be briefly described as follows.

BRIEF DESCRIPTION OF THE DRAWINGS

FIG. 1 is a diagrammatic illustration of vehicle communication system designed according to this invention.

FIG. 2 is a schematic illustration of a vehicle communication system designed according to this invention.

DETAILED DESCRIPTION OF THE PREFERRED EMBODIMENTS

FIG. 1 diagrammatically illustrates a vehicle communication system 20 for facilitating communications between devices associated with a vehicle 22 and remotely located devices such as a key fob 24, a transmitting tower 26, a home security system 28, and/or a garage door opener 30. There is a need for providing simplified systems that allows communication between a variety of devices supported on a vehicle and a variety of remotely located devices.

A system designed according to this invention preferably uses an antenna 32 to facilitate communications between the vehicle communication system and the remotely located devices. The antenna 32 is coupled with a radio receiver 34 so that the radio receiver receives broadcast radio signals that are collected by the antenna 32. A trainable transmitter 36 is also coupled to the antenna 32. The trainable transmitter 36 preferably includes the ability to learn a variety of communication signals and then generate those signals for communication with a variety of peripheral or remotely located devices.

The preferred embodiment of the transmitter 36 is one that is trainable to learn a variety of communication signals and then duplicate those signals from the single transmitter. U.S. patent application Ser. No. 09/027,323, which was filed on Feb. 20, 1998, discloses the preferred embodiment of the trainable transmitter 36 that is used with this invention. The teachings of that patent application are incorporated into this specification by reference.

It should also be understood that alternative topologies or techniques for programming a transmitter can be used with this invention. Whichever technique is used to accomplish a trainable transmitter function, the present invention would extend to such trainable transmitters. That is, while the above-referenced U.S. patent application is the preferred transmitter, the invention is in no way limited to this technique.

The preferred embodiment of the portions of the communication system that are supported on the vehicle 22 is schematically illustrated in FIG. 2. The trainable transmitter 36 preferably includes several basic components. A signal generator 40, which preferably is a voltage controlled oscillator having a wide frequency range, is used to transmit the communication signals from the transmitter 36. A receiver 42, which preferably is a diode detector, preferably is included to allow the transmitter 36 to receive signals from other transmitters and then duplicate the communication signal generated by the other transmitter. An electronic controller 44, which preferably is a microprocessor, includes several modules. A memory module is used to store the signals that are received by the receiver 42 so that the transmitter portion 40 can later duplicate those signals for transmitting the desired communication signal. A control module within the controller 44 controls the function of the transmitter 40 according to inputs received by manually activated switches 46 and 48, for example. Assume that the memory module within the controller 44 includes a stored garage door opener signal and a home security system signal. Assume further that the switch 46 is activated when the user desires to send a signal to the garage door opener 30. Similarly, the switch 48 is activated when the user desires to communicate with the home security system 28. The control module within the controller 44 determines which of the switches has been activated and causes the transmitter 40 to generate an appropriate signal.

The controller 44 preferably also includes a function selection module that facilitates selecting the function of the antenna 32. This module of the controller 44 communicates with a function selector 50 over a communication link schematically illustrated at 52. In the illustrated embodiment, the function selector 50 includes a switch that is activated responsive to a signal from the controller 44. When it is desirable to transmit a communication signal from the transmitter 36, the function selector switch 50 is moved into the position illustrated in FIG. 2 so that the antenna 32 is coupled through a terminal 54 to the transmitter 36. In that condition, the communication signal from the transmitter 36 can be emitted from the antenna 32.

The function selector 50 preferably is normally biased into an operative condition where the antenna 32 is connected through a terminal 56 to the radio receiver 34 so that the incoming, collected radio signals can be received by the receiver 34 in a conventional manner. Whenever it is desirable to emit a communication signal from the transmitter 36, the function selector 50 is activated to provide a momentary link between the antenna 32 and the transmitter 36. During this brief time (which is typically much less than one second) the radio receiver 34 is temporarily disconnected from the antenna 32. The short duration required to emit a communication signal, however, will not normally interfere with the user's appreciation of the broadcast signals that are handled by the radio receiver 34.

In the illustrated embodiment, an optional enhancement is included by providing a signal separator 58 between the radio receiver 34 and the function selector 50. The signal separator 58 preferably separates signals that are collected by the antenna 32 into a high band category and a low band category. The low band category preferably includes broadcast radio signals that are within a selected range that are to be received and processed by the radio receiver 34. High band signals, on the otherhand, preferably are communicated to a vehicle receiver 60, which preferably is capable of receiving signals from remote devices such as the key fob 24. In this example, a desired operation of a vehicle anti-theft system is completed through the vehicle receiver 60. The preferred arrangement and embodiment of the signal separator 58 can be a diplexer that separates the broadcast radio signals into a low band category and the transmitted signal from the transmitter 24 into a high band category. The diplexer also isolates the high band signals from the low band signals, which prevents interference in communicating between the radio receiver 34 and the vehicle receiver 60. The signal separator can also take the form of a filter associated with the radio receiver 34 that passes the broadcast radio signals and a filter associated with the vehicle receiver 60 that passes signals from the transmitter 24. Together such filters would comprise the signal separator 58.

In one embodiment, the components of FIG. 2 are all housed together in a single housing that is placed where a radio or stereo system typically is placed within a vehicle. In the example embodiment, the switches 46 and 48 are switches on the radio console that are dedicated to communication between the transmitter 36 and remotely located devices. In one example, the transmitter 36 and the receiver 60 are useful as a cellular telephone. Embodying the cellular telephone components within a single housing with an AM/FM receiver according to this invention provides the significant advantage of allowing a driver of a vehicle to communicate by cellular telephone without having to operate a separate, hand-held unit while driving. In that embodiment, of course, a microphone is provided in a conventional manner so that the driver of the vehicle can speak the communication signals into the system that are then emitted by the transmitter 36 and communicated to a cellular telephone network in a conventional manner.

Providing a system designed according to this invention has the advantage of utilizing the conventional radio antenna 32 for more than one purpose. This provides the advantages of reducing the number of components required for a communication system that is capable of communicating with a variety of devices. Further, the placement of the antenna 32 on the vehicle provides the advantage of giving better and more direct communication between the transmitter 36 and the remotely located devices. The externally mounted antenna does not suffer from the drawbacks associated with antennas that are otherwise hidden from view and shielded within the structure of the vehicle.

The controller 44 preferably is a conventional microprocessor. Given this description, those skilled in the art will be able to chose from among commercially available microprocessors or to custom design circuitry and/or software to realize a controller as required for this invention. Moreover, although a plurality of modules are described in association with the controller 44 those skilled in the art will realize that one or more such modules could be used. Further, each module could be embodied in discrete circuit components, separate microprocessors, integrated circuit tips or custom-designed software.

The preceding description is exemplary rather than limiting in nature. Variations and modifications to the disclosed embodiments may become apparent to those skilled in the art that do not depart from the purview and spirit of this invention. The scope of legal protection given to this invention is to be limited only by the following claims including all legal equivalents.

I claim:

1. A vehicle communication system comprising:

an antenna supported on the vehicle:

an AM/FM radio receiver coupled to said antenna for receiving broadcast radio signals collected by said antenna;

a transmitter for selectively generating a plurality of communication signals, wherein each communication signal communicates with a different corresponding device remote from the vehicle, said transmitter being coupled to said antenna for emitting the communication signals; and a plurality of manual actuators, each corresponding to a different one of the devices, for causing said transmitter to generate the communication signal for the corresponding device.

2. The system of claim 1, further comprising a function selector coupled between said antenna and said radio receiver and between said antenna and said transmitter, said function selector having a first operative condition where said radio receiver is coupled to said antenna and said transmitter is not coupled to said antenna and a second operative condition where said transmitter is coupled to said antenna and said radio receiver is not coupled to said antenna and wherein said selector is normally in said first operative condition and selectively placed into said second operative condition.

3. The system of claim 2, further comprising an electronic controller coupled to said function selector for selectively placing said selector into said second operative condition.

4. The system of claim 1, further comprising a function switch coupled between said antenna and said transmitter and between said antenna and said radio receiver, said function switch selectively coupling said transmitter to said antenna such that the communication signal can be emitted by said antenna.

5. The system of claim 4, further comprising an electronic controller in communication with said function switch and said transmitter, said electronic controller selectively activating said switch to selectively couple said transmitter to said antenna such that said transmitted signal is emitted by said antenna.

6. The system of claim 1, wherein said manual actuators comprise a plurality of manually actuatable switches coupled to said transmitter.

7. The system of claim 6, further comprising a housing that houses said radio receiver, said transmitter and said function switch and supports said manually actuatable switches.

8. The system of claim 1, further comprising:

a vehicle receiver coupled to said antenna for receiving from a device remote from said vehicle a second communication signal collected by said antenna for initiating a vehicle function; and a signal separator coupled between said antenna and said radio receiver and between said antenna and said vehicle receiver for directing the collected radio signals to said radio receiver and the collected second communication signal to said vehicle receiver.

9. The system of claim 8, further comprising a function switch that includes a first port coupled to said antenna, a second port coupled to said transmitter and a third port coupled to said signal separator and wherein said function switch is actuatable to selectively allow signal communication between said first and second ports or between said first and third ports, respectively.

10. The system of claim 9, wherein said signal separator has an input coupled to said antenna, a first output coupled to said radio receiver and a second output coupled to said vehicle receiver and wherein the collected radio signals are directed through said first output and the collected communication signal is directed through said second output.

11. The system of claim 8, wherein said transmitter and said vehicle receiver comprise a cellular telephone.

12. A vehicle communication system comprising:

an antenna supported on the vehicle:

an AM/FM radio receiver coupled with said antenna for receiving broadcast radio signals that are collected by said antenna; and a transmitter for selectively generating a communication signal, said transmitter being coupled to said antenna for emitting the communication signal for communicating with a device located remotely from the vehicle, wherein said transmitter includes a second receiver for receiving an externally transmitted signal and a memory device for capturing and storing the received externally transmitted signal such that said transmitter later generates the communication signal consistent with the externally transmitted signal.

13. The system of claim 12, wherein said transmitter further comprises a voltage controlled oscillator that generates a signal consistent with the stored signal from said memory device.

14. The system of claim 12, wherein said second receiver comprises a frequency independent receiver.

* * * * *